United States Patent
Joshi

(10) Patent No.: US 8,400,789 B2
(45) Date of Patent: Mar. 19, 2013

(54) POWER SUPPLY WITH INPUT FILTER-CONTROLLED SWITCH CLAMP CIRCUIT

(75) Inventor: Rahul Prabhakar Joshi, Pleasanton, CA (US)

(73) Assignee: Power Integrations, Inc., San Jose, CA (US)

( * ) Notice: Subject to any disclaimer, the term of this patent is extended or adjusted under 35 U.S.C. 154(b) by 303 days.

(21) Appl. No.: 12/768,575

(22) Filed: Apr. 27, 2010

(65) Prior Publication Data

US 2011/0261594 A1    Oct. 27, 2011

(51) Int. Cl.
*H02M 3/335*    (2006.01)
(52) U.S. Cl. ............... 363/21.12; 363/21.18; 363/50
(58) Field of Classification Search ............. 323/207, 323/223, 282; 363/15, 21.01, 21.12, 21.18, 363/39, 41, 50, 53, 123, 124; 361/8, 13, 361/118
See application file for complete search history.

(56) References Cited

U.S. PATENT DOCUMENTS

| | | | |
|---|---|---|---|
| 4,710,695 A | 12/1987 | Yamada et al. | |
| 4,937,728 A | 6/1990 | Leonardi | |
| 4,970,620 A | 11/1990 | Lehnhoff et al. | |
| 5,239,453 A | 8/1993 | Remson | |
| 5,404,287 A | 4/1995 | Poumey | |
| 5,506,764 A | 4/1996 | Hon et al. | |
| 5,530,385 A * | 6/1996 | Miettinen | 327/108 |
| 5,602,724 A * | 2/1997 | Balakrishnan | 363/21.15 |
| 6,317,341 B1 * | 11/2001 | Fraidlin et al. | 363/56.09 |
| 7,453,709 B2 * | 11/2008 | Park et al. | 363/21.15 |
| 7,489,530 B2 * | 2/2009 | Paull | 363/56.01 |
| 7,596,004 B2 * | 9/2009 | Grbovic | 363/21.12 |
| 8,139,379 B2 * | 3/2012 | Shih et al. | 363/21.08 |
| 2002/0163821 A1 * | 11/2002 | Odell | 363/56.11 |
| 2003/0048646 A1 * | 3/2003 | Odell | 363/56.12 |
| 2004/0100806 A1 * | 5/2004 | Odell | 363/56.11 |
| 2008/0080212 A1 * | 4/2008 | Grbovic | 363/21.12 |
| 2009/0045790 A1 * | 2/2009 | Hong et al. | 323/282 |
| 2010/0309689 A1 * | 12/2010 | Coulson | 363/16 |

OTHER PUBLICATIONS

Grbović, P., "High-Voltage Auxiliary Power Supply Using Series-Connected MOSFETs and Floating Self-Driving Technique," IEEE Transactions on Industrial Electronics, May 2009, pp. 1446-1455, vol. 56, No. 5. (10 pages).

Baker, R. et al., "Stacking power MOSFETs for use in high speed instrumentation," Review of Scientific Instruments, Dec. 1992, pp. 5799-5801, vol. 63, No. 12. (3 pages).

Joshi, R. "Novel Power Supply Topology for Very High Voltage Flyback Power Supply," Staff Applications Engineer, Power Integrations Conference dated Oct. 30-Nov. 1, 2007. (7 pages).

* cited by examiner

*Primary Examiner* — Adolf Berhane
*Assistant Examiner* — Lakaisha Jackson
(74) *Attorney, Agent, or Firm* — Blakely Sokoloff Taylor & Zafman LLP

(57) ABSTRACT

An example power supply in accordance with the teachings of the present disclosure includes a switch, an energy transfer element, a controller, an input filter, and a switch clamp circuit. The energy transfer element is coupled to the switch and the controller is coupled to control the switch to regulate an output of the power supply. The input filter is coupled to receive an input voltage of the power supply and includes a first input filter capacitor coupled to a node and a second input filter capacitor coupled to the node. The switch clamp circuit is also coupled to the node to clamp a voltage across the switch in response to a voltage at the node.

6 Claims, 3 Drawing Sheets

POWER SUPPLY WITH INPUT FILTER-CONTROLLED SWITCH CLAMP CIRCUIT

TECHNICAL FIELD

This disclosure relates generally to power supplies, and in particular but not exclusively, relates to high voltage switching power supplies.

BACKGROUND INFORMATION

Power supplies may be used for a multitude of purposes and applications. Industrial equipment operating from a high voltage alternating current (ac) supply input often needs a power supply that can provide a regulated low voltage direct current (dc) supply output to power analog and digital circuitry. Such a power supply may convert the high voltage ac into the regulated low voltage dc power usable in applications such as industrial motor drives, uninterruptible power supply (UPS) systems, and energy meters.

One type of power supply is a switching power supply that includes a switch coupled to an energy transfer element. In operation, the switch is utilized to provide the desired output by varying the duty cycle (typically the ratio of the on time of the switch to the total switching period), varying the switching frequency, or varying the number of pulses per unit time of the switch in a switching power supply. The switch is controlled with a power supply control circuit to convert the high voltage ac input into the regulated dc output through the energy transfer element. However, in high voltage applications, such as industrial applications, the switching power supply must be designed to handle high peak input voltages higher than the line voltage provided by the input power source because of line voltage fluctuations. For example, industrial applications typically utilize an input power source of 440 volts (V) ac. After rectification and filtering, the 440 V ac is translated into a direct current voltage of about 625 V dc. With line voltage fluctuations, the power supply should be designed to handle voltages up to 800 V dc.

Typically, the switching power supply includes a clamp circuit coupled across a primary winding of the energy transfer element to limit the voltage across the primary winding to prevent damage to the switch. While the conventional clamp circuit may limit the voltage across the primary winding of the energy transfer element, high voltages may still accumulate across the switch. Thus, when the conventional power supply utilizes a transistor for the switch, the transistor would need to have a high drain-source breakdown voltage (e.g., greater than 1200 volts dc) to handle the high voltages which may accumulate across the transistor. Such high voltage transistors are typically very expensive and add to the cost of the power supply.

In some circumstances, the conventional switching power supply may include an additional clamp circuit coupled to limit the voltage across the switch. One example conventional power supply is shown in U.S. Pat. No. 5,602,724, entitled "Low-Cost, High-Voltage, Flyback Power Supply," which illustrates in FIG. 2 the use of a transistor 155 to limit a voltage on switch 150. As shown in FIG. 2 of U.S. Pat. No. 5,602,724, power supply 100 further includes a capacitor 114 to filter the input voltage and a separate resistor divider (i.e., resistors 160 and 165) to control transistor 155. However, the use of resistors 160 and 165 adds to the component count and decreases the efficiency of power supply 100 due to dissipation across each resistor, particularly at high input voltages.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a Power Supply with an Input Filter-Controlled Switch clamp circuit are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

In short, embodiments of the present invention include a power supply with a switch clamp circuit to limit a voltage across the switch of the power supply, where the switch clamp circuit is controlled by an input filter of the power supply. Thus, power supplies in accordance with the teachings of the present disclosure have a reduced component count that enables miniaturization of the power supply. Furthermore, embodiments of the present invention can reduce the power supply cost and can offer energy efficiency improvements in the operation of the power supply at high voltages, as will be discussed further below.

Figure 1:
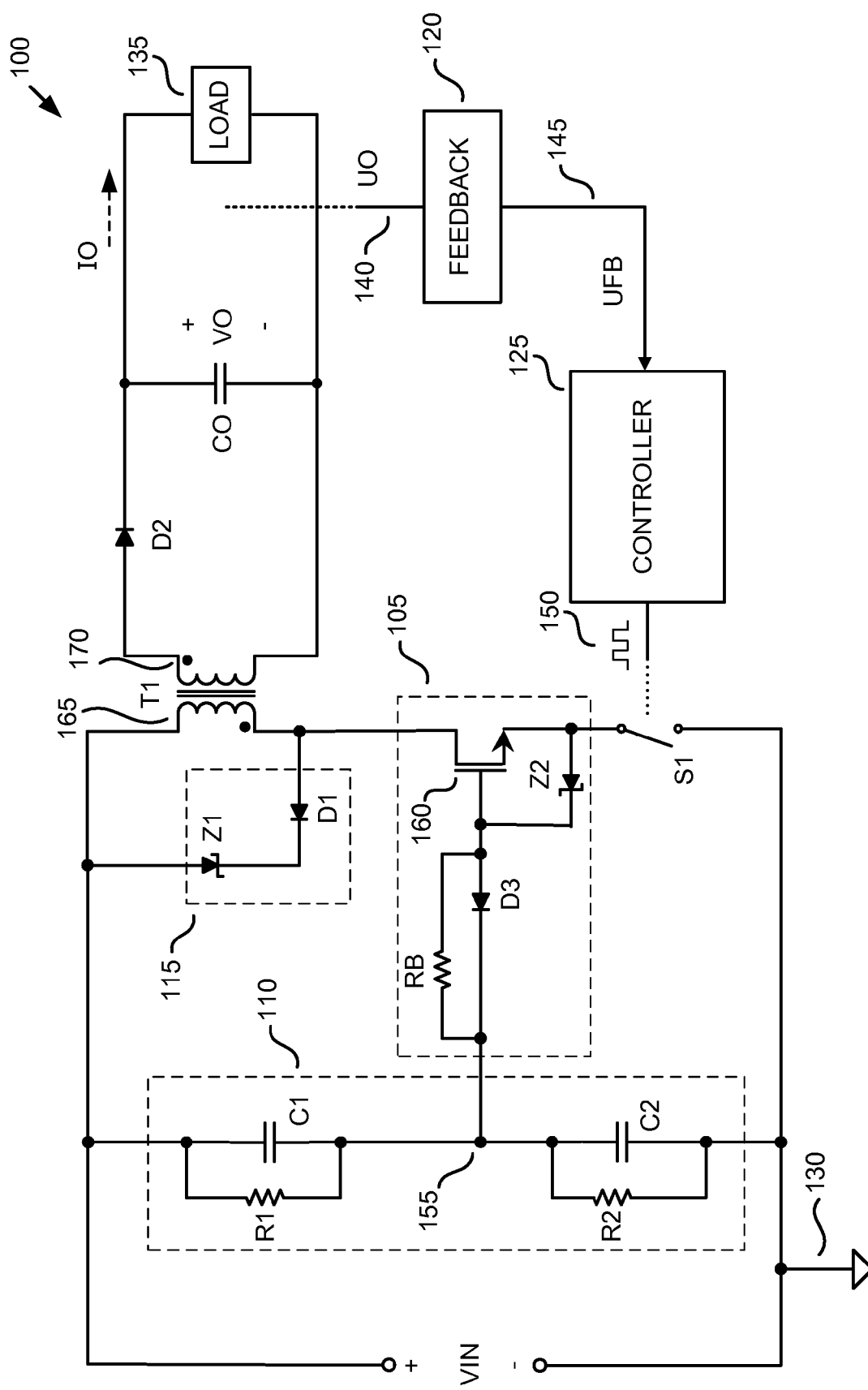
FIG. 1 is a schematic diagram illustrating a power supply having a switch clamp circuit controlled by an input filter to limit a voltage across a switch, in accordance with an embodiment of the invention.

FIG. 1 is a schematic diagram illustrating a power supply 100 having a switch clamp circuit 105 controlled by an input filter 110 to limit a voltage across a switch S1, in accordance with an embodiment of the invention. The illustrated embodiment of power supply 100 includes switch clamp circuit 105, input filter 110, switch S1, an energy transfer element T1, a rectifier D2, an output capacitor CO, a feedback circuit 120, a controller 125, and a common reference 130. Switch clamp circuit 105 is illustrated as including a transistor 160, a Zener diode Z2, a diode D3, and a resistor RB. FIG. 1 further illustrates clamp circuit 115 as including a diode D1 and a Zener diode Z1. Input filter 110 is shown in FIG. 1 as including a node 155, input filter capacitors C1 and C2, and resistors R1 and R2. Energy transfer element T1 is illustrated as including a primary winding 165 and a secondary winding 170. Also illustrated in FIG. 1 are load 135, output quantity UO 140, feedback signal 145, and drive signal 150.

As shown in FIG. 1, input filter 110 is coupled to receive input voltage VIN. In one example, input voltage VIN is an ac voltage that has been rectified by a rectifier circuit (not shown). In the illustrated example, power supply 100 is a flyback power supply adapted to convert the input voltage VIN from one voltage level to another to produce an output voltage VO. In one example, power supply 100 steps down the input voltage VIN such that the output voltage VO is less than the input voltage VIN of power supply 100. However, it is appreciated that other known topologies and configurations of switching power supplies may also benefit from the teachings of the present invention.

As further shown in FIG. 1, load 135 is coupled to receive output voltage VO and output current IO. The switching power supply 100 further comprises circuitry to regulate the output quantity UO 140. In general, the output quantity UO is either an output voltage VO, output current IO, or a combination of the two. Feedback circuit 120 is coupled to sense the output quantity UO 140 and to produce feedback signal UFB 145. In the example of FIG. 1, controller 125 receives the feedback signal UFB 145. Feedback signal UFB 145 is representative of an output of power supply 100. For example, feedback signal UFB 145 may be representative of output voltage VO, output current IO or a combination of both. In response to feedback signal UFB 145, controller 125 generates drive signal 150 which is received by the switch S1. In one example, drive signal 150 has a duty ratio that is controlled by controller 125. In another example, the drive signal 150 has a switching frequency that is controlled by controller 125. Typically, the switching frequency of drive signal 150 is much greater than the frequency of input voltage signal VIN when the input voltage signal VIN is an ac voltage that has been rectified by a rectifier circuit (not shown). For example, input voltage VIN may have a frequency of 60 Hz, while drive signal 150 may have a switching frequency greater than 1 kHz. The switch S1 is opened and closed in response to the drive signal 150 to substantially regulate the output quantity UO 140 to a desired value. It is generally understood that a switch that is closed may conduct current and is considered on, while a switch that is open cannot conduct current and is considered off.

Galvanic isolation is typically maintained between the primary winding 165 and secondary winding 170 in the transmission of the feedback signal UFB to controller 125 by ordinary methods known to those skilled in the art, such as for example the use of an optical coupler (not shown) or for example the use of a signal transformer (not shown).

In operation, switch S1 is controlled by controller 125 to produce a voltage on primary winding 165 of energy transfer element T1 (e.g., a transformer) from input voltage VIN. Secondary winding 170 of energy transfer element T1 produces a voltage proportional to the voltage on the primary winding 165. The switching of the switch S1 produces a pulsating current at rectifier D2. The current in rectifier D2 is filtered by the output capacitor CO to produce a substantially constant output voltage VO, output current IO or the combination of the two at the load 135. In the example of FIG. 1, rectifier D2 is exemplified as a diode. However, in some embodiments the rectifier D2 may be a transistor used as a synchronous rectifier.

In one example, switch S1 is a semiconductor device such as for example metal oxide semiconductor field effect transistor (MOSFET), or for example bipolar junction transistor (BJT), or for example insulated gate bipolar transistor (IGBT). In another example, controller 125 may be implemented as a monolithic integrated circuit or may be implemented with discrete electrical components or a combination of discrete and integrated components. Controller 125 and switch S1 could form part of an integrated circuit that is manufactured as either a hybrid or a single monolithic integrated circuit.

As discussed above, input filter 110 is coupled to receive input voltage VIN. Input filter 110 is shown as including input filter capacitors C1 and C2 coupled to node 155. In one example, input filter capacitors C1 and C2 filter input voltage VIN by reducing a ripple voltage amplitude seen at the input of power supply 100. In one example, the turning on and off of switch S1 may produce a high frequency current or EMI, where input filter capacitors C1 and C2 in combination with the source impedance of the power supply input are coupled to reduce or prevent this high frequency current from reaching the input of power supply 100 and thus reduce the effect of EMI on other equipment. Input filter capacitor C1 may include a first terminal directly connected (i.e., without an intervening passive or active component) to the positive input terminal of input voltage VIN. Input filter capacitor C1 may also include a second terminal directly connected to node 155. Similarly, input filter capacitor C2 may include a terminal directly connected to node 155 and another terminal directly connected to the negative terminal (e.g., common reference 130) of input voltage VIN. Thus, in one example, the voltage at node 155 may be substantially equal to one-half the input voltage VIN.

In one example, each of the input filter capacitors of FIG. 1 (e.g., C1 and/or C2) may be a single passive circuit component, such as a device having two conducting surfaces separated by an insulating material or dielectric. In another example, the input filter capacitor may include one or more individual circuit components coupled together to provide an effective capacitance (e.g., represented in FIG. 1 by input filter capacitor C1).

A conventional power supply may include a single capacitor coupled between the positive and negative input terminals of the power supply to function as the input filter. However, in high voltage applications a capacitor rated to handle high voltages, such as 440 V ac used in industrial applications, may be expensive or may not even exist. Accordingly, in accordance with embodiments of the present disclosure, an input filter includes two or more capacitors rated for a lower voltage rather than a single capacitor rated for a higher voltage. In general, it can be more cost effective to use more capacitors rated for a lower voltage than a single capacitor rated for a high voltage. When two capacitors are utilized for the input filter, the voltage across each capacitor is substantially equal to one-half the input voltage VIN when each capacitor has substantially the same capacitance (e.g., $C1 \cong C2$). In addition, when utilizing two input capacitors rather than a single input capacitor, the capacitance for each of the two input capacitors is substantially double the capacitance of the single input filter capacitor (e.g., $C1 \cong C2 \cong 2 \times$ Capacitance of Single Capacitor). When using N number of capacitors for the input filter, the voltage across each capacitor is substantially equal to 1/N VIN and the capacitance of each of the N number of capacitors is substantially N times greater than the capacitance needed for a single capacitor rated to handle the input voltage VIN. For the example shown in FIG. 1, the voltage at node 155 may be substantially equal to one-half the input voltage VIN when input filter capacitors C1 and C2 have substantially the same capacitance.

Also shown as included in input filter 110 are resistors R1 and R2. In one example, R1 is coupled across (i.e., in parallel with) capacitor C1 to control the inherent leakage current of capacitor C1. That is, resistor R1 may have a resistance value such that a current that flows through resistor R1 is greater than the inherent leakage current of capacitor C1. Thus, in operation, resistor R1 may render the leakage current of capacitor C1 negligible. Similarly, resistor R2 is coupled across capacitor C2 to control the inherent leakage current of capacitor C2. In one example, a capacitance value of C1 is substantially equal to a capacitance value of C2. Also, the combined voltage rating of capacitors C1 and C2 is equal to or greater than an expected peak voltage value of input voltage VIN.

Power supply 100 is further shown as including clamp circuit 115 coupled across primary winding 165 of energy transfer element T1. Clamp circuit 115 may be configured to limit a voltage across primary winding 165 when switch S1 is off. In addition, the clamp circuit 115 may limit the maximum voltage across the transistor 160 and the switch S1.

Power supply 100 also includes switch clamp circuit 105 coupled to limit a voltage across switch S1 when switch S1 is off. In one example, switch clamp circuit 105 is configured to clamp the voltage across switch S1 in response to a voltage at node 155. For example, switch clamp circuit 105 may limit a voltage across switch S1 to a value substantially equal to the voltage at node 155. As discussed above, switch S1 may include a MOSFET. In addition, the transistor 160 may be a semiconductor device such as a MOSFET or a BJT. When the transistor 160 is a MOSFET, the transistor has three terminals commonly referred to as the gate, drain and source terminals. For the example of FIG. 1, transistor 160 may be connected to the MOSFET of switch S1 in a cascode arrangement such that the source of transistor 160 is connected to the drain of MOSFET switch S1. The source of transistor 160 is illustrated as being connected to its gate by Zener diode Z2. The gate of transistor 160 is connected to resistor RB and diode D3. Resistor RB may be arranged in parallel to diode D3 such as shown in FIG. 1 to prevent oscillation of the gate voltage of transistor 160. In addition, resistor RB is coupled to prevent an excessive voltage to the gate and diode D3 facilitates the turning off of transistor 160.

In operation, when the power supply 100 is first turned on, input voltage VIN is provided to input filter 110. As discussed above, input filter capacitors C1 and C2 filter the input voltage and provide a voltage at node 155 that, in one embodiment, is substantially equal to one-half the input voltage VIN when input filter capacitors C1 and C2 have substantially equal capacitance. The voltage at node 155 then facilitates the turn on of transistor 160.

Also upon start up, controller 125 receives power and begins switching switch S1 on and off. When the switch S1 is on, the voltage across the switch S1 is substantially equal to zero. As such, the source voltage of the transistor 160 is substantially equal to the voltage at the common reference 130. As mentioned above, in one example the voltage at node 155 is substantially equal to one-half the input voltage VIN. In one embodiment, the voltage at the common reference 130 is substantially equal to zero. When the switch S1 is on, the gate voltage 160 is substantially equal to the breakdown voltage of the Zener diode Z2. The voltage between the gate and the source of transistor 160 is substantially equal to the breakdown voltage of the Zener diode Z2 which is greater than the threshold voltage of transistor 160 and the transistor 160 turns on. At this point in the operation of power supply 100, both transistor 160 and switch S1 are turned on. In addition, Zener diode Z2 limits the voltage difference between gate and the source of transistor 160 to prevent damage to the transistor 160. In one embodiment, the Zener diode Z2 has a breakdown voltage substantially equal to or less than the maximum voltage between the gate and source of transistor 160 for the transistor 160 to operate as a switch.

When the controller 125 turns the switch S1 off, switch S1 is substantially an open circuit, which causes the current through switch S1 to become zero. When the current through switch S1 is zero, the drain current through transistor 160 becomes zero as well, and the transistor 160 turns off. When the switch S1 turns off, the drain of transistor 160 is pulled to a voltage above the input voltage VIN due to the magnetizing energy of the transformer T1. In other words the transistor 160 turns on when switch S1 turns on and the transistor 160 turns off when switch S1 turns off.

After switch S1 is turned off a voltage spike caused by leakage inductance in the primary winding 165 occurs for a short period of time. As such, the drain voltage of transistor 160 increases to a voltage above the input voltage VIN. The source voltage of transistor 160 also increases. Once the source voltage of transistor 160 reaches the gate voltage minus the threshold voltage of the transistor 160, the transistor 160 turns off. As such, the switch S1 sees a voltage substantially equal to the gate voltage minus the threshold voltage of the transistor 160. When the transistor 160 is off, the gate voltage is substantially equal to the voltage at the node 155. In other words, the switch S1 is clamped to a voltage substantially equal to the voltage at node 155.

In addition, when switch S1 is off, the current through the primary winding 165 of the energy transfer element T1 may be recycled back into the input filter capacitors C1 and C2 through the Miller capacitance of transistor 160 (capacitance between the gate and drain of transistor 160) and diode D3 thereby increasing the efficiency of power supply 100. In other words, part of the energy in the primary winding 165 of the energy transfer element T1 may be recycled back into the input filter 110.

Figure 2:
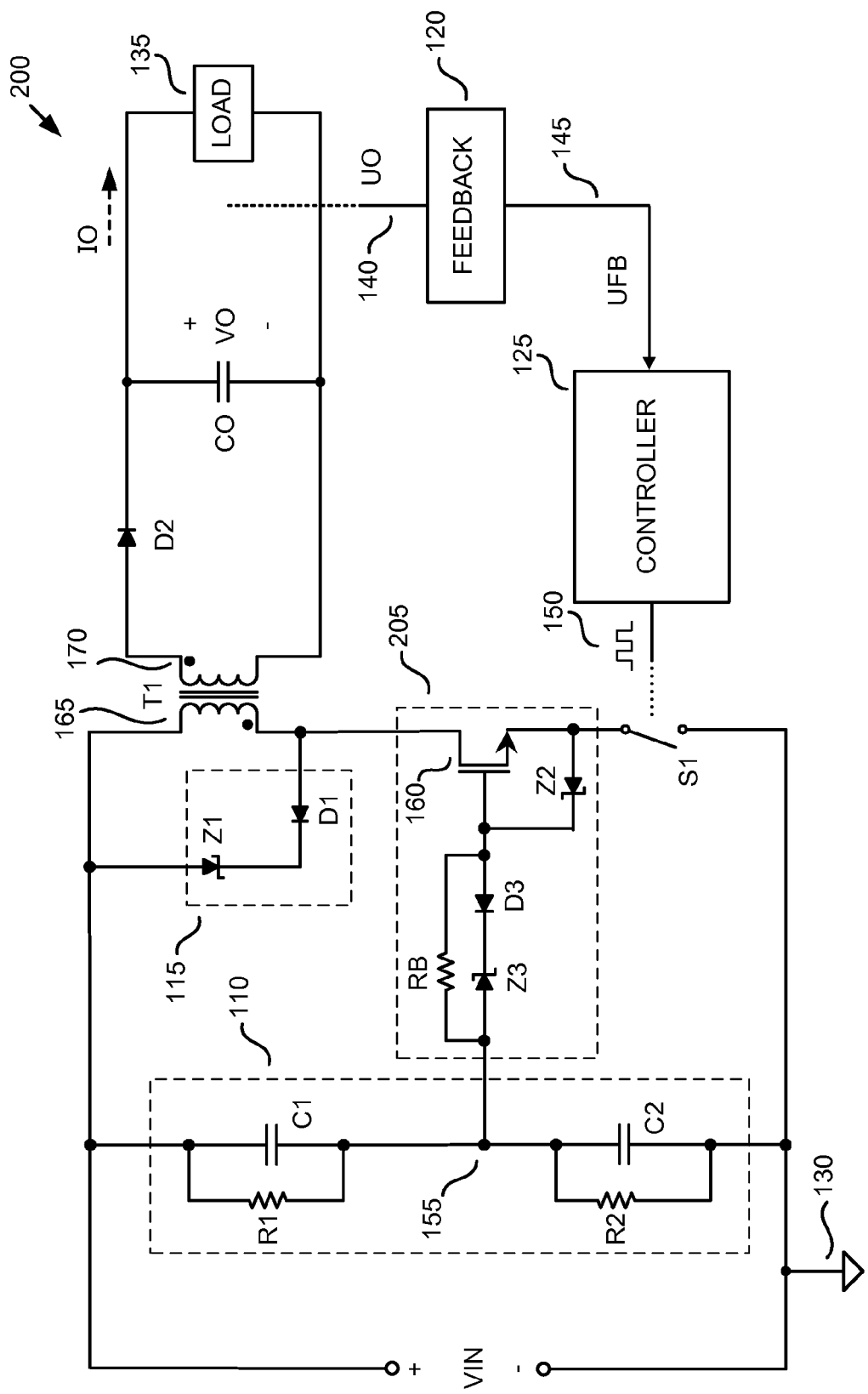
FIG. 2 is a schematic diagram illustrating a power supply having a switch clamp circuit controlled by an input filter to limit a voltage across a switch, where the switch clamp circuit includes an additional Zener diode, in accordance with an embodiment of the invention.

FIG. 2 is a schematic diagram illustrating a power supply 200 having a switch clamp circuit 205 controlled by input filter 110 to limit a voltage across switch S1, where switch clamp circuit 205 includes an additional Zener diode Z3, in accordance with an embodiment of the invention. The illustrated embodiment of power supply 200 includes switch clamp circuit 205, input filter 110, switch S1, energy transfer element T1, rectifier D2, output capacitor CO, feedback circuit 120, controller 125, and common reference 130. Switch clamp circuit 205 is illustrated as including transistor 160, Zener diode Z2, a diode D3, Zener diode Z3, and resistor RB. FIG. 2 further illustrates clamp circuit 115 as including diode D1 and Zener diode Z1. Input filter 110 is shown in FIG. 2 as including node 155, input filter capacitors C1 and C2, and resistors R1 and R2. Energy transfer element T1 is illustrated as including primary winding 165 and secondary winding 170. Also illustrated in FIG. 2 are load 135, output quantity 140, feedback signal 145, and drive signal 150.

Power supply 200 couples and operates similarly to power supply 100 of FIG. 1, with the addition of Zener diode Z3 in switch clamp circuit 205. As discussed above, input filter capacitors C1 and C2 may be coupled to provide a voltage at node 155 that is substantially one-half the input voltage VIN when input filters C1 and C2 have substantially equal capacitances. The addition of Zener diode Z3 allows switch clamp circuit 205 to clamp the voltage across switch S1 to greater than the voltage at node 155 (i.e., greater than one-half the input voltage VIN). In other words, the switch S1, in the embodiment of FIG. 2, sees a voltage substantially equal to the voltage at node 155 plus the breakdown voltage of Zener diode Z3.

Figure 3:
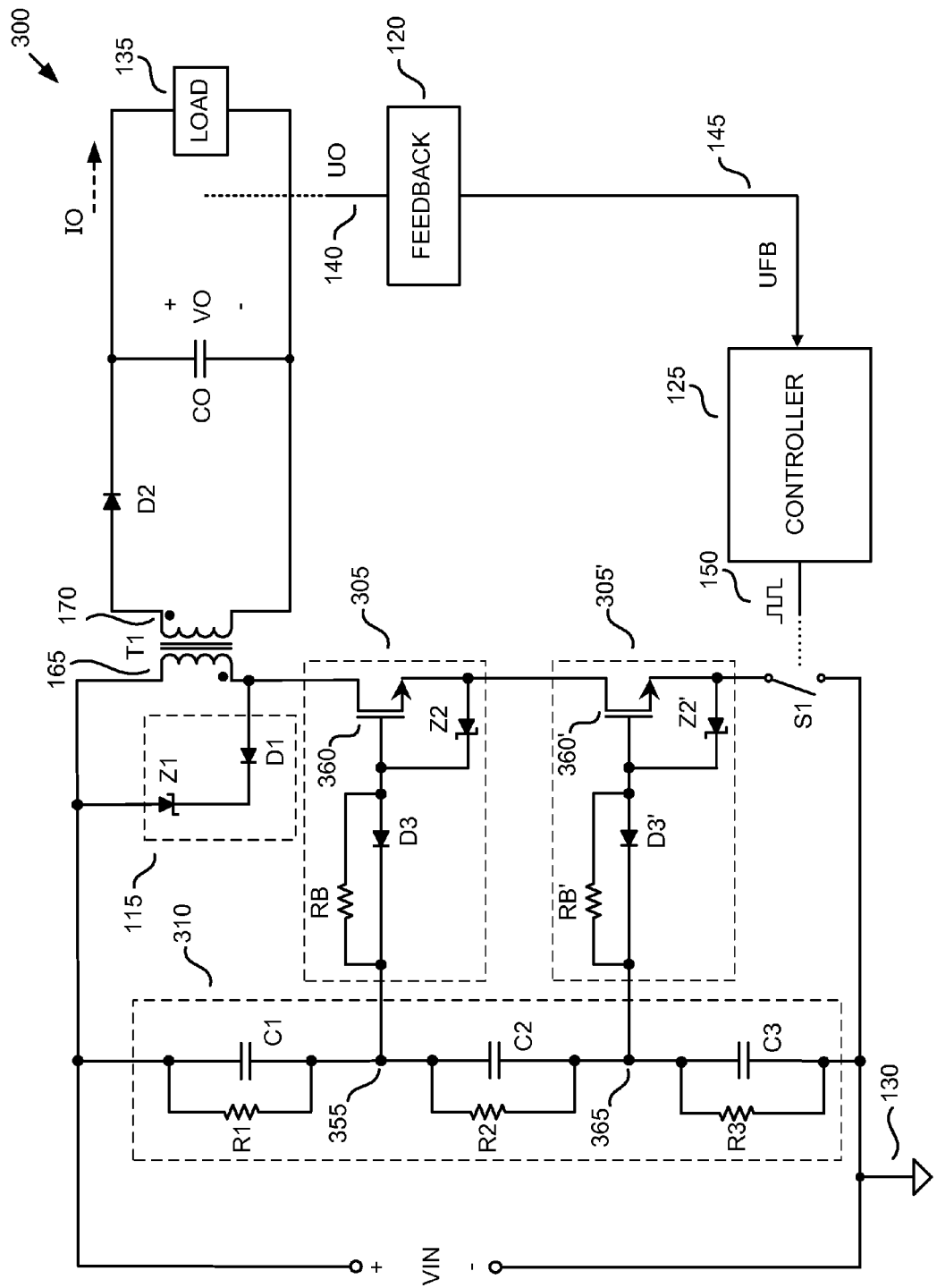
FIG. 3 is a schematic diagram illustrating a power supply having two switch clamp circuits that are controlled by an input filter to limit a voltage across a switch wherein the input filter includes three input filter capacitors.

FIG. 3 is a schematic diagram illustrating a power supply 300 having two switch clamp circuits 305 and 305' that are controlled by an input filter 310 to limit a voltage across switch S1 wherein the input filter includes three input filter capacitors C1, C2, and C3. The illustrated embodiment of power supply 300 includes switch clamp circuits 305 and 305', input filter 310, switch S1, energy transfer element T1, rectifier D2, output capacitor CO, feedback circuit 120, controller 125, and common reference 130. Switch clamp circuit 305 is illustrated as including a transistor 360, Zener diode Z2, diode D3, and resistor RB, while switch clamp circuit 305' is illustrated as including a transistor 360', a Zener diode Z2', a diode D3', and a resistor RB'. FIG. 3 further illustrates clamp circuit 115 as including diode D1 and Zener diode Z1. Input filter 310 is shown in FIG. 3 as including nodes 355 and 365, input filter capacitors C1, C2, and C3, and resistors R1, R2, and R3. Energy transfer element T1 is illustrated as including primary winding 165 and secondary winding 170. Also illustrated in FIG. 3 are load 135, output quantity 140, feedback signal 145, and drive signal 150.

Power supply 300 couples and operates similarly to power supply 100 of FIG. 1. However, power supply 300 includes an input filter 310 having an additional input filter capacitor. In particular, input filter 310 includes input filter capacitors C1, C2, and C3, and resistors R1, R2, and R3. Power supply 300 is also illustrated as including switch clamp circuits 305 and 305'. Although FIG. 3 illustrates power supply 300 as including three input filter capacitors and two switch clamp circuits, any number of input filter capacitors and switch clamp circuits may be utilized in accordance with the teachings of the present disclosure. For example, power supply 300 may include N number of input filter capacitors and N−1 number of switch clamp circuits each coupled to a respective node between input filter capacitors. As mentioned above, the voltage across each input filter is substantially equal to 1/N VIN when each of the input filter capacitors have substantially equal capacitances.

The inclusion of additional input filter capacitors and switch clamp circuits for clamping the voltage across switch S1 allows the voltage across switch S1 to be clamped to less than one-half of the input voltage VIN. For example, in the embodiment of FIG. 3, switch clamp circuits 305 and 305' limit the voltage across switch S1 to approximately one-third of the input voltage VIN.

Still referring to FIG. 3, input filter 310 is coupled to receive input voltage VIN. Input filter 310 is shown as including input filter capacitors C1 and C2 coupled to node 355 and input filter capacitors C2 and C3 coupled to node 365. In one example, input filter capacitors C1, C2 and C3 filter input voltage VIN by reducing a ripple voltage amplitude seen at the input of power supply 300. Input filter capacitor C1 may include a first terminal directly connected (i.e., without an intervening passive or active component) to the positive input terminal of input voltage VIN. Input filter capacitor C1 may also include a second terminal directly connected to node 355. Similarly, input filter capacitor C2 may include a terminal directly connected to node 355 and another terminal directly connected to node 365. Input filter capacitor C3 may include a terminal directly connected to node 365 and another terminal directly connected to the negative terminal (e.g., common reference 130) of input voltage VIN. Thus, in one example, the voltage at node 355 may be substantially equal to two-thirds the input voltage VIN and the voltage at node 365 may also be substantially equal to one-third the input voltage VIN.

Also shown as included in input filter 310 are resistors R1, R2 and R3. In one example, R1 is coupled across (i.e., in parallel with) capacitor C1 to control the inherent leakage current of capacitor C1. Similarly, resistor R2 is coupled across capacitor C2 to control the inherent leakage current of capacitor C2 and resistor R3 is coupled across capacitor C3 to control the inherent leakage current of capacitor C3. In one example, the capacitance of input filter capacitors C1, C2, and C3 are substantially equal. In another example, the voltage at node 355 may be different than the voltage at node 365 by choosing a differing capacitance value of at least one of the input filter capacitors. Also, the combined voltage rating of capacitors C1, C2, and C3 is equal to or greater than an expected peak voltage value of input voltage VIN.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A power supply, comprising:
    a switch;
    an energy transfer element coupled to the switch;
    a controller coupled to control the switch to regulate an output of the power supply;
    an input filter coupled to receive an input voltage of the power supply, wherein the input filter includes:
        a first input filter capacitor coupled to a first node;
        a second input filter capacitor coupled to the first node and coupled to a second node; and
        a third input filter capacitor coupled to the second node;
    a first switch clamp circuit coupled to the first node; and
    a second switch clamp circuit coupled to the second node, wherein the first and second switch clamp circuits clamp a voltage across the switch in response to voltages at the first and second nodes.

2. The power supply of claim 1, wherein the input filter further includes:
    a first resistor coupled across the first input filter capacitor to control leakage current of the first input filter capacitor;
    a second resistor coupled across the second input filter capacitor to control leakage current of the second input filter capacitor; and
    a third resistor coupled across the third input filter capacitor to control leakage current of the third input filter capacitor.

3. The power supply of claim 1, wherein the first input filter capacitor includes a first terminal directly connected to the first node, the second input filter capacitor includes a second terminal directly connected to the first node and a third terminal directly connected to the second node, and wherein the third input filter capacitor includes a fourth terminal directly connected to the second node.

4. The power supply of claim 1, wherein the voltage at the first node is substantially equal to two-thirds the input voltage of the power supply.

5. The power supply of claim 1, wherein the voltage at the second node is substantially equal to one-third the input voltage of the power supply.

6. The power supply of claim 1, wherein the switch comprises a metal oxide semiconductor field effect transistor (MOSFET) and wherein the switch and the controller are integrated into a single monolithic integrated device.

* * * * *